(12) United States Patent
Sugaya (10) Patent No.: US 6,992,996 B2
(45) Date of Patent: Jan. 31, 2006

(54) NETWORK MANAGEMENT METHOD, WIRELESS TRANSMISSION METHOD AND WIRELESS TRANSMISSION APPARATUS

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1060 days.

(21) Appl. No.: 09/839,820

(22) Filed: Apr. 20, 2001

(65) Prior Publication Data

US 2002/0009154 A1 Jan. 24, 2002

(30) Foreign Application Priority Data

Apr. 24, 2000 (JP) ............................ P2000-123134

(51) Int. Cl.
*H04Q 7/00* (2006.01)
(52) U.S. Cl. ...................................... 370/328; 370/400
(58) Field of Classification Search ................ 370/254, 370/310, 310.2, 312, 328, 338, 341, 373, 370/377, 384, 385, 395.3, 400, 316, 364, 370/386, 395.35, 395.31, 402; 709/227, 709/250, 249
See application file for complete search history.

(56) References Cited

U.S. PATENT DOCUMENTS 5,991,292 A * 11/1999 Focsaneanu et al. ........ 370/352
6,510,151 B1 * 1/2003 Cioli et al. ................. 370/352

* cited by examiner

*Primary Examiner*—Brenda Pham
(74) *Attorney, Agent, or Firm*—Jay H. Maioli (57) ABSTRACT

A network management method, a wireless transmission method and a wireless transmission apparatus in which bus connection information connected to a network can be managed efficiently. According to this network management method, when the structure of the bus connected to a preceding communication station of its own communication station is changed, a notice indicating that connection bus information are changed is supplied to the network, whereby all communication stations making up the network can share the connection bus information. Therefore, the respective communication stations can manage the corresponding connection bus information in a decentralized fashion.

7 Claims, 6 Drawing Sheets

| Wireless Network (20 Wireless Bus) | Connected Bus:21,22,23,24,25 |
|---|---|
| 11 Communication Stations #1 | Connected Bus:21,25 |
| 12 Communication Stations #2 | Connected Bus:22 |
| 13 Communication Stations #3 | Connected Bus:23 |
| 14 Communication Stations #4 | Connected Bus:24 |

NETWORK MANAGEMENT METHOD, WIRELESS TRANSMISSION METHOD AND WIRELESS TRANSMISSION APPARATUS

BACKGROUND OF THE INVENTION

1. Field of the Invention

The present invention relates to a network management method, a wireless transmission method and a wireless transmission apparatus which are suitably applied to a wireless network system in which a wireless network is constructed by connecting various devices with wireless transmission apparatus by radio.

2. Description of the Related Art

First, an IEEE 1394 format which can be applied to a network system constructed in a wired fashion will be described. In an IEEE 1394-1995 high-speed serial bus standard, there is prescribed a method of transmitting information by both of coexisting isochronous (Isochronous: isochronous) transfer mode as a transmission method maintaining a band and an asynchronous (Asynchronous: asynchronous) transfer mode which can transfer asynchronous information at an arbitrary timing When these high-speed serial buses are used, moving picture information which requires a real time property is transferred according to the isochronous (isochronous) transfer mode and personal computer file information which requires high reliability is transferred according to the asynchronous (asynchronous) transfer mode.

Under the circumstances of the IEEE 1394-1995 standard which are connected in a wired fashion, when a plurality of buses are connected in a bridge fashion, information relating to bus ID which indicates a corresponding bus and a root node (Root Node) manages corresponding information as register information of a CSR (Control and Status Register) in a centralized fashion. Register).

This CSR register information can be immediately looked up by each node because buses are connected in a wired fashion under circumstances of the IEEE 1394-1995 standard.

Next, a wireless IEEE 1394 format will be described. At present, a wireless transmission method conforming to the IEEE 1394-1995 standard which is the high-speed serial bus standard is under examination.

In the wireless 1394 format having links connected by radio, there is assumed a method in which information common to these networks is managed by locating a control station operable similarly to the root node under circumstances of the IEEE 1394-1995 standard connected in a wired fashion at the center of the wireless network.

With respect to the CSR register information under circumstances of the IEEE 1394-1995 standard connected in a wired fashion, according to the wireless 1394 format, there is assumed a method of managing information in a centralized fashion by the control station.

SUMMARY OF THE INVENTION

However, according to the prior art, when CSR register information in the circumstances of the IEEE 1394-1995 standard connected by radio is managed in a centralized fashion by the control station of the wireless 1394 formats such information has to be constantly broadcast (Broadcast)-transmitted to the wireless network.

For example, there is assumed a method of cyclically broadcast-transmitting slot reservation (Slot Reservation) information from the control station as information relating to an isochronous resource management (Isochronous Resource Management).

However, when connection bus information which is information of bus connected to each communication station is broadcast-transmitted cyclically from the control station in a like manner, the control station has to prepare connection bus information connected to each communication station by the amount corresponding to the number of the communication stations. There is then the disadvantage that an information amount becomes huge over the whole of the network.

Further, since this connection bus information is not altered when the bus structure is not changed, the frequency in which such information is updated is not larger than that of the above slot reservation information.

When this connection bus information is managed by only the control station similarly to the circumstances of the IEEE 1394-1995 standard connected in a wired fashion, the ordinary communication station other than the control station has to request bus ID information added to transmitted information from the control station when information is transmitted. In each case, the ordinary communication station has to receive designation of the communication station to which information is transmitted by radio. There is then the disadvantage that it takes plenty of time to start transmission of information.

Accordingly, in view of the aforesaid aspects, it is an object of the present invention to provide a network management method, a wireless transmission method and a wireless transmission apparatus in which connection bus information connected to a network can be managed with high efficiency.

This invention is to provide as a management method of bus ID which is connection bus information connected to the whole of the wireless network in the wireless 1394 system, for example, a network management method in which network connection bus information that should be transmitted by radio can be managed by all communication stations.

Thus, when a bus structure of a preceding communication station of its own communication station is changed, each communication station can broadcast-transmit the notice indicating that these connection bus information are changed to the wireless network so that each communication station can manage such information.

Further, this invention is to provide a network management method in which connection bus information used to identify bus ID connected to every communication station can be managed by all communication stations.

As a result, whenever each communication station transmits connection bus ID information through the bus by preparing information of all communication station, the communication station to which information is transmitted by radio can be designated.

According to this invention, there is provided a network management method in which when the structure of bus is changed, connection bus information indicating the corresponding bus of bus ID connected to the preceding communication station of each communication station is informed to the whole of the wireless network.

Thus, when the structure of the bus connected to the preceding communication station of its own communication station is changed, the notice indicating that the connection bus information is altered can be broadcast-transmitted to the network.

According to this invention, there is provided a wireless transmission method in which when a transmission destination to which information is transmitted by radio is designated, it is determined based on bus information of wireless transmission information in the corresponding wireless network and network connection bus information connected to the corresponding wireless network whether or not wireless transmission is required.

According to this wireless transmission method, each communication station manages rooting of information transmitted through the wireless bus as the connection bus information of the network, whereby it can be determined whether or not information should be transmitted by radio when information is transmitted.

Further, according to this invention, there is provided the wireless transmission apparatus or the wireless transmission method in which when information is transmitted in the wireless interval, a destination communication station can be designated by looking bus ID information contained in that information from previously-distributed connection bus information of other communication station, whereby the destination communication station to which information is transmitted by radio can be designated.

Thus, the destination communication station to which information is transmitted by radio can be specified from connection bus information prepared at every communication station.

DESCRIPTION OF THE PREFERRED EMBODIMENTS

According to this embodiment, in a wireless network system, there are provided a network management method in which information of bus connected to each communication station comprising the network is managed at every communication station, a wireless transmission method in which it is determined based on that connection bus information whether or not wireless transmission is required and a wireless transmission method and a wireless transmission apparatus in which a destination communication station is designated.

Figure 1:
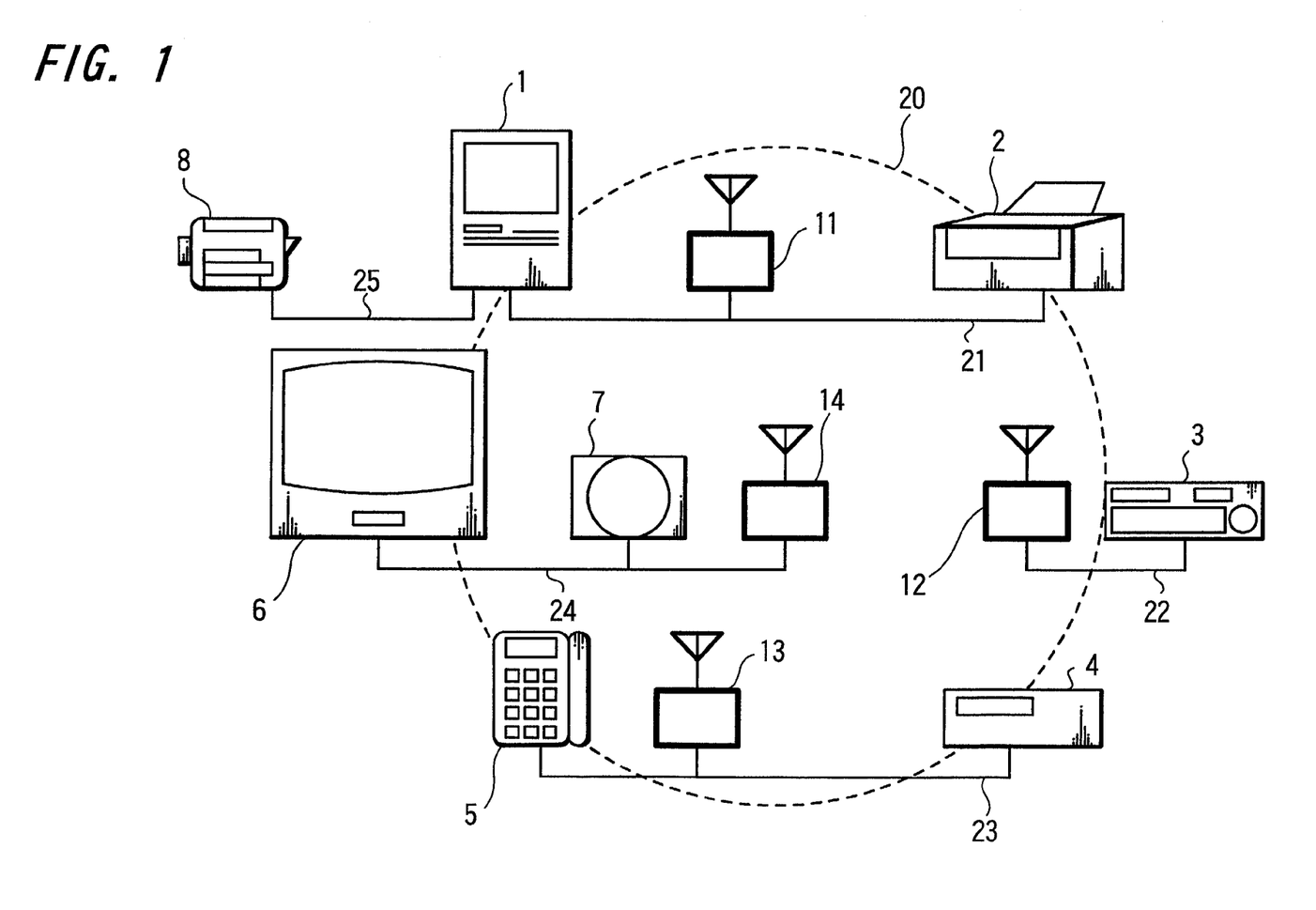
FIG. 1 is a diagram showing an example of an arrangement of a wireless network to which a wireless transmission method according to this embodiment is applied.

This embodiment will be described below. FIG. 1 is a diagram showing an example of an arrangement of a network system to which a network management method and a wireless transmission method according to this embodiment can be applied.

For example, as shown in FIG. 1, a personal computer 1 and a printer output apparatus 2 are connected through a bus 21 to a wireless transmission apparatus 11 in a wired fashion. A VTR (video tape recorder) 3 is similarly connected through a bus 22 to a wireless transmission apparatus 12 in a wired fashion. A telephone device 5 and a set-top box 4 are similarly connected through a bus 23 to a wireless transmission apparatus 13 in a wired fashion. A television receiver 6 and a game device 7 are similarly connected through a bus 24 to a wireless transmission apparatus 14 in a wired fashion.

Further, the personal computer 1 is served as a bridge apparatus for connecting the buses and a VTR having a built-in camera (digital video tape recorder having a built-in camera) 8 is connected through a bus 25 to the personal computer. In this manner, the respective devices are connected to the respective wireless transmission apparatus and the respective wireless transmission apparatus comprise a network. For convenience' sake, a wireless network is treated as a wireless bus 20.

Figure 2:
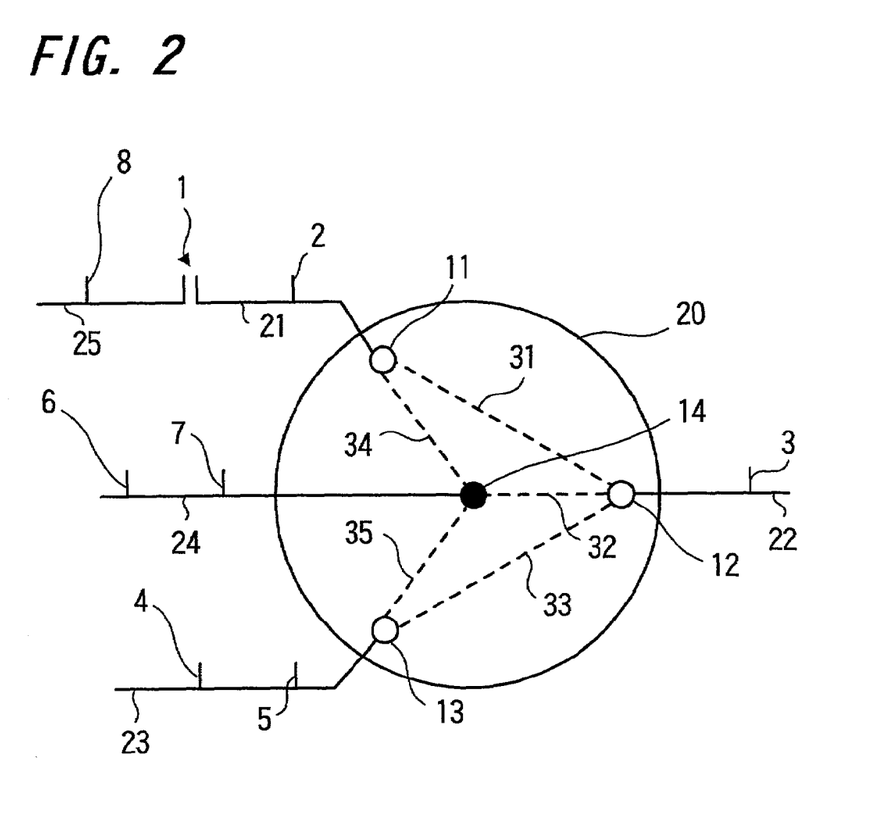
FIG. 2 is a diagram schematically showing a network connection form.

FIG. 2 is a diagram schematically showing a network connection form.

FIG. 2 shows the state in which the wireless network (wireless bus 20) comprising the wireless transmission apparatus 11, 12, 13 of the terminal communication stations shown by open circles are formed around the wireless transmission apparatus 14 of the control station shown by a solid circle. The personal computer 1 and the printer output apparatus 2 are connected through the bus 21 to the wireless transmission apparatus 11 as shown by a solid line. The VTR 3 is connected through the bus 22 to the wireless transmission apparatus 12 as similarly shown by a solid line. The telephone device 5 and the set-top box 4 are connected through the bus 23 to the wireless transmission apparatus 13 as similarly shown by a solid line. The television receiver 6 and the game device 7 are connected through the bus 24 to the wireless transmission apparatus 14 as similarly shown by a solid line.

Further, the personal computer 1 which serves as a bridge apparatus for connecting a bus is connected to the wireless transmission apparatus 11 and the VTR having a built-in camera 8 is connected through the bus 25 to this wireless transmission apparatus.

Within the wireless network (wireless bus 20), the control section 14 is able to communicate with all communication stations 11 to 13 on the network (wireless bus 20) through network lines 34, 32, 35 shown by dashed lines.

On the other hand, while the communication station 11 is unable to directly transmit information to the distant communication station 13, this communication station is able to communicate with the control station 14 and the communication station 12 on the network (wireless bus 20) through network lines 34, 31 shown by dashed lines.

The communication station 12 is able to communicate with the control station 14 and the communication stations 11, 13 on the network (wireless bus 20) through the network lines 32, 31, 33 shown by dashed lines.

While the communication station 13 is unable to directly transmit information to the distant communication station 11, this communication station is able to communicate with the control station 14 and the communication station 12 on the network (wireless bus 20) through network lines 35, 33 shown by dashed lines.

Figure 3:
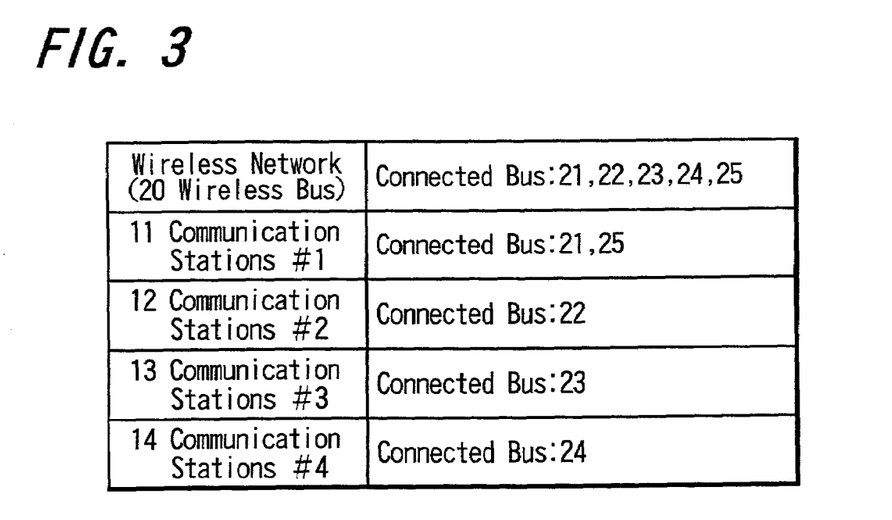
FIG. 3 is a diagram showing an example of a format of connection bus information.

FIG. 3 shows an example of a format of connection bus information.

In FIG. 3, it is illustrated that bus ID: 21 to bus ID: 25 are connected to the wireless bus (bus ID: 20) as connection bus information managed by the whole wireless network. Connection bus information managed by the whole wireless network will be referred to as "network connection bus information".

From the above, it can be understood that the bus ID: 21 to the bus ID: 25 are designated as network connection bus information.

Further, the bus IDs: 21, 25 are described as connection bus information of the communication station 11 (#1), the bus ID: 22 is described as connection bus information of the communication station 12 (#2), the bus ID: 23 is described as connection bus information of the communication station 13 (#3) and the bus ID: 24 is described as connection bus information of the communication station 14 (#4).

When a certain communication station transmits information by radio, these connection bus information can be used to designate corresponding communication stations as destination communication stations by the bus IDs described in the information as destinations.

Figure 4:
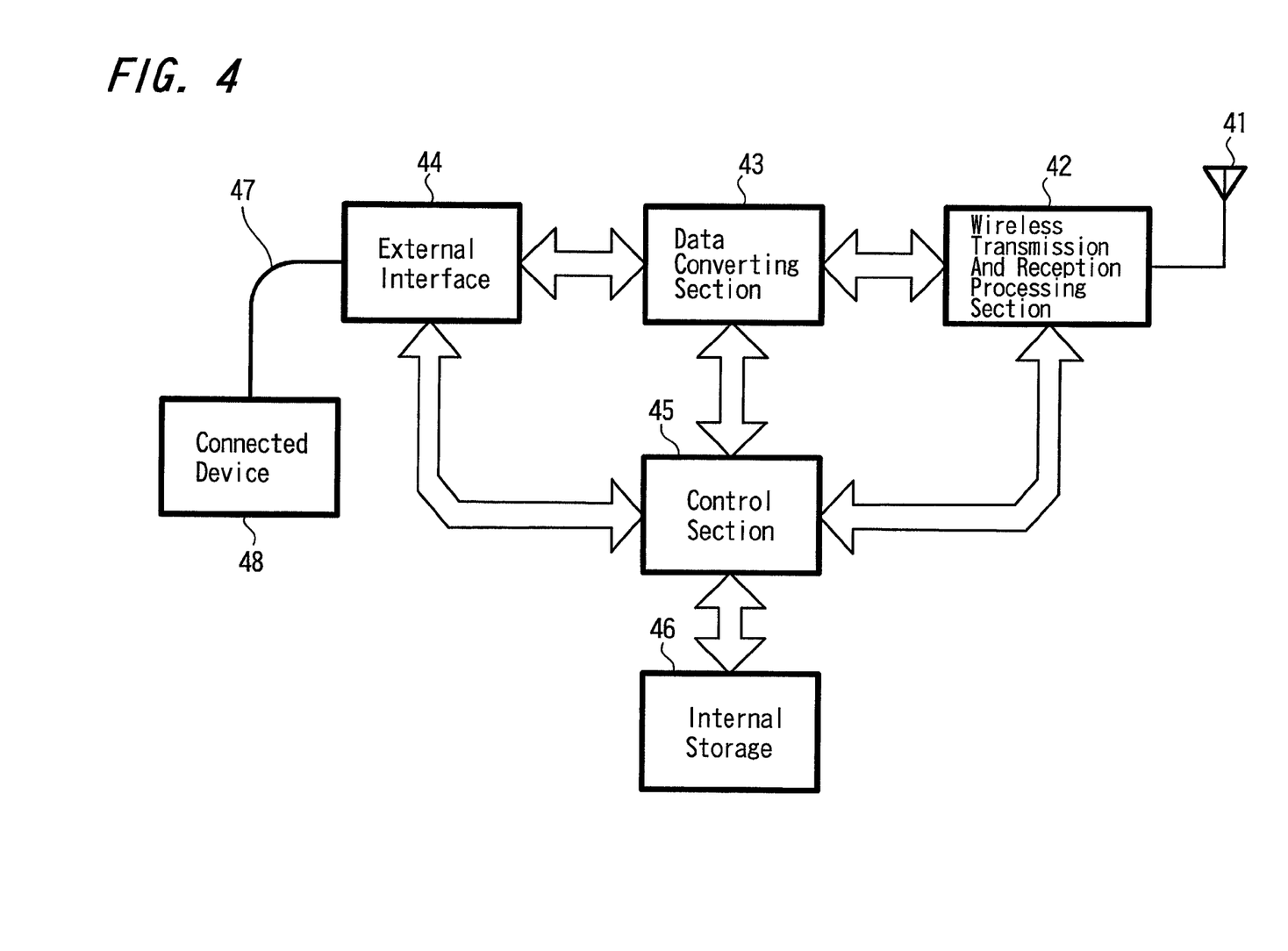
FIG. 4 is a diagram showing an example of an arrangement of a wireless transmission apparatus which comprises each communication station.

FIG. 4 shows an example of an arrangement of the wireless transmission apparatus 11 to 14 comprising the respective communication stations.

The respective wireless transmission apparatus 11 to 14 have a common arrangement fundamentally and include an antenna 41 for transmitting and receiving information and a wireless transmission and reception processing section 42 connected to this antenna 41 for effecting wireless transmission processing and wireless reception processing so that they can transmit information between them and other transmission apparatus by radio.

In this case, as a transmission system in which the wireless transmission and reception processing section 42 according to this embodiment transmits and receives information, there is applied a multicarrier signal transmission system called an OFDM (Orthogonal Frequency Division Multiplex: orthogonal frequency division multiplex) system, for example. As a frequency used to transmit and receive information, there is used a very high frequency band (e.g, 5 GHz band).

In the case of this embodiment, a relatively low output is set as a transmission output. When the wireless transmission apparatus is used indoors, for example, a transmission output is high enough to enable transmission by radio in a relatively short distance up to about several meters to several 10s of meters.

Then, the wireless transmission apparatus includes a data converting section 43 for data-converting a signal received at the wireless transmission and reception processing section 42 and data-converting a signal transmitted at the wireless transmission and reception processing section 42.

Further, data converted by the data converting section 43 can be supplied to a connected device 48 which is a processing apparatus connected to the data converting section through an interface section 44. Simultaneously, data supplied from the connected device 48 can be supplied through the interface section 44 to the data converting section 43 and thereby converted.

As an external interface of the interface section 44 of the wireless transmission apparatus, audio and video information or various data information can be transmitted and received to and from the connected device 48 through a high-speed serial bus 47 such as the IEEE 1394 format, for example.

Alternatively, the connected device 48 may incorporate these wireless transmission apparatus in the main body thereof.

The respective sections within the wireless transmission apparatus may execute processing under control of a control section 45 comprised of a microcomputer or the like.

In this case, when a signal received at the wireless transmission and reception processing section 42 is a control signal such as connection bus information, the signal thus received is supplied through the data converting section 43 to the control section 45 so that the control section 45 can set the respective sections to the states indicated by the received control signal.

Further, an internal storage 46 is connected to the control section 45, and the internal storage 46 can store therein connection bus information connected to the wireless network and connection bus information corresponding to the respective communication stations.

Then, in the wireless transmission apparatus 14 which serves as the control station of the network, a synchronizing signal of a corresponding network is supplied from the control section 45 through the data converting section 43 to the wireless transmission and reception processing section 42 at a predetermined frame period and thereby transmitted by radio.

In the wireless transmission apparatus 11 to 13 of the communication stations which are not the control station of the network, when the received signal is the synchronizing signal, the received signal is supplied through the data converting section 43 to the control section 45. Then, the control section 45 judges a timing at which the synchronizing signal should be received, sets a frame period based on the synchronizing signal and executes communication control processing at the frame period.

Figure 5:
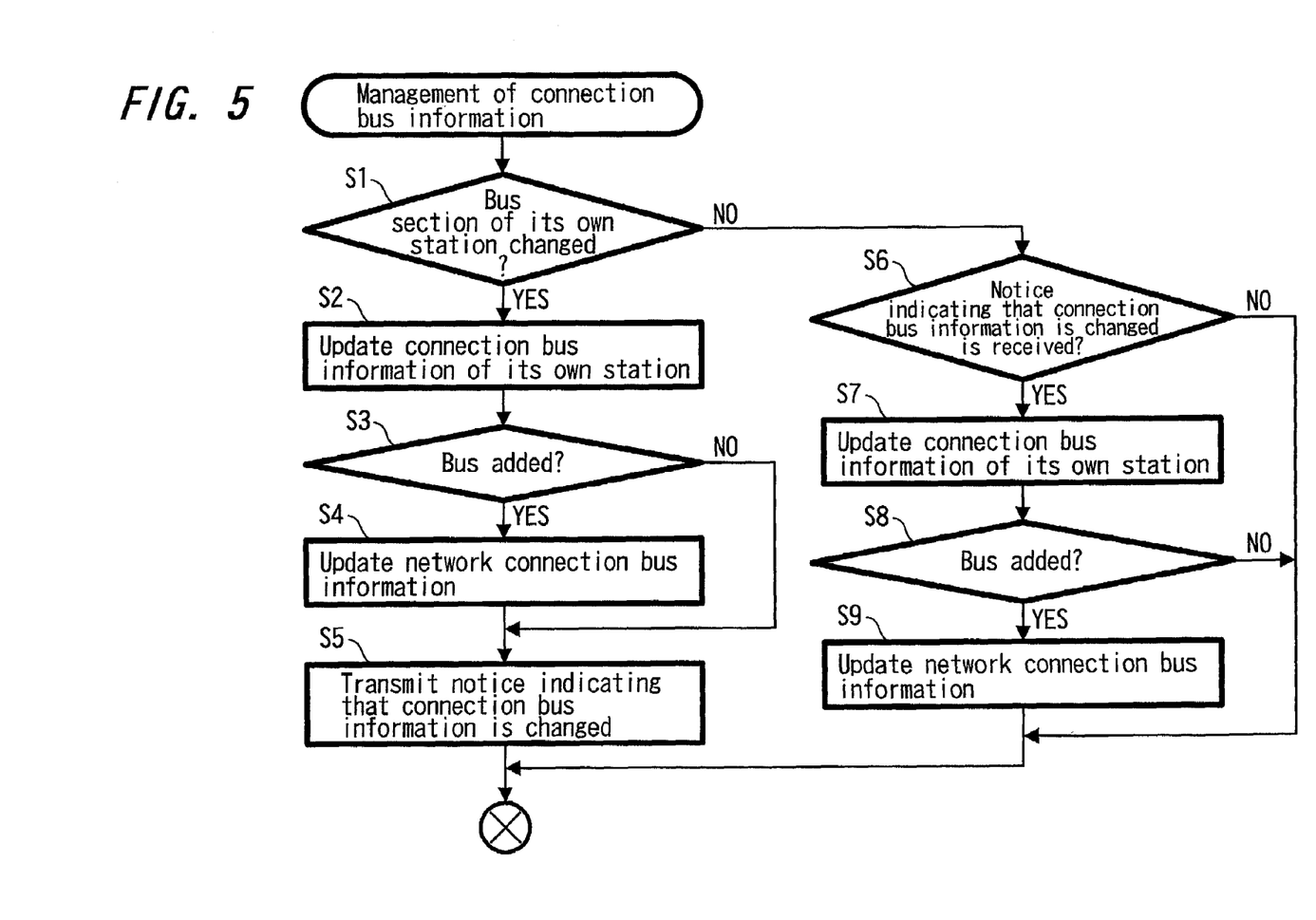
FIG. 5 is a flowchart to which reference will be made in explaining the manner in which connection bus information is managed in each wireless transmission apparatus.

FIG. 5 is a flowchart to which reference will be made in explaining operations of a management method of connection bus information in each wireless transmission apparatus.

Referring to the sheet of drawing, it is determined at a step S1 whether or not the connection bus structure within the bus in which the wireless transmission apparatus of its own station is contained is changed If the connection bus structure is changed, then control goes to a step S2, whereat connection bus information of its own communication station is updated.

Thereafter, it is determined at a step S3 whether a new bus is added or a bus is deleted If it is determined that a bus is not added or not deleted, then control goes to a step S5. If it is determined that a bus is added or deleted, then network connection bus information is updated at a step S4.

Thereafter, at a step S5, a notice indicating that these connection bus information are changed is transmitted to the network and a series of processing is ended.

If it is determined at the step S1 that the bus structure of its own communication station is not changed and if is determined at the step S6 that a notice indicating that connection bus information is changed is received from other communication station, then connection bus information of a corresponding communication station is updated at a step S7.

Further, it is determined at a step S5 whether a new bus is added to other communication station or a bus is deleted from other station. If it is determined that a new bus is added to other communication station or a bus is deleted from other communication station, then network connection bus information is updated at a step S9. If it is determined that a new bus is not added to other communication station or a bus is not deleted from other communication station, the processing is ended.

If it is determined at the step S6 that the notice indicating that the connection bus information of other communication station is changed is not received, then the processing is not executed.

Further, the control station of the network may equally supply the same information to all communication stations on the network by relaying and transmitting these information. The above connection bus information management operation may be respectively carried out by the respective wireless transmission apparatus.

Figure 6:
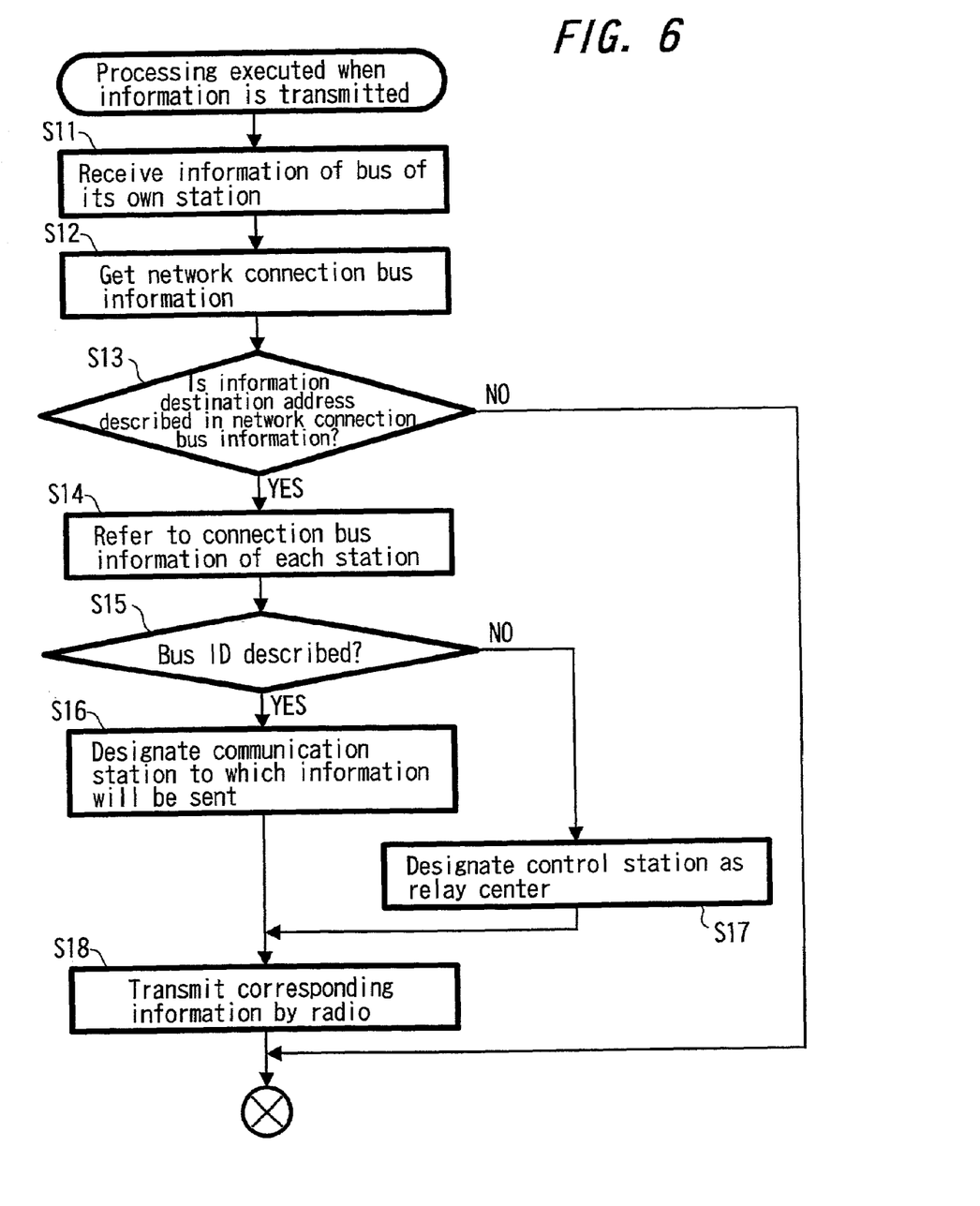
FIG. 6 is a flowchart to which reference will be made in explaining operations of processing executed when information is transmitted in each wireless transmission apparatus.

FIG. 6 is a flowchart to which reference will be made in explaining processing executed when each wireless transmission apparatus transmits information.

Referring to the sheet of drawing, at a step S11, it is assumed that information transmitted into the bus contained in the wireless transmission apparatus of its own station is received.

First, network connection bus information is acquired at a step S12. Then, it is determined at a step S13 whether or not a destination address (bus ID) of corresponding transmitted information is described in network connection bus information.

If the destination address (bus ID) of information is described in the network connection bus information as represented by a YES at the step S13, then connection bus information of each communication station is referred to at a step S14. Then, it is determined at a step S15 whether or not the destination address (bus ID) of the corresponding transmitted information is described in connection bus information of a certain communication station.

If the connection bus information is described in the destination address as represented by a YES, then control goes to a step S16, whereat an information destination communication station within a corresponding bus is designated. At a step S18, corresponding information is transmitted by radio, and a series of processing is ended.

If connection bus information is not described in the destination address as represented by a NO at the step S15, then the control station is temporarily designated as a relay destination at the step S17 according to the need. Then, corresponding information is transmitted by radio at the step S18.

If it is determined at the step S13 that the destination address (bus ID) of information is not described in the network connection bus information, then information within that bus need not be transmitted by radio, and therefore the processing is ended.

Figure 7:
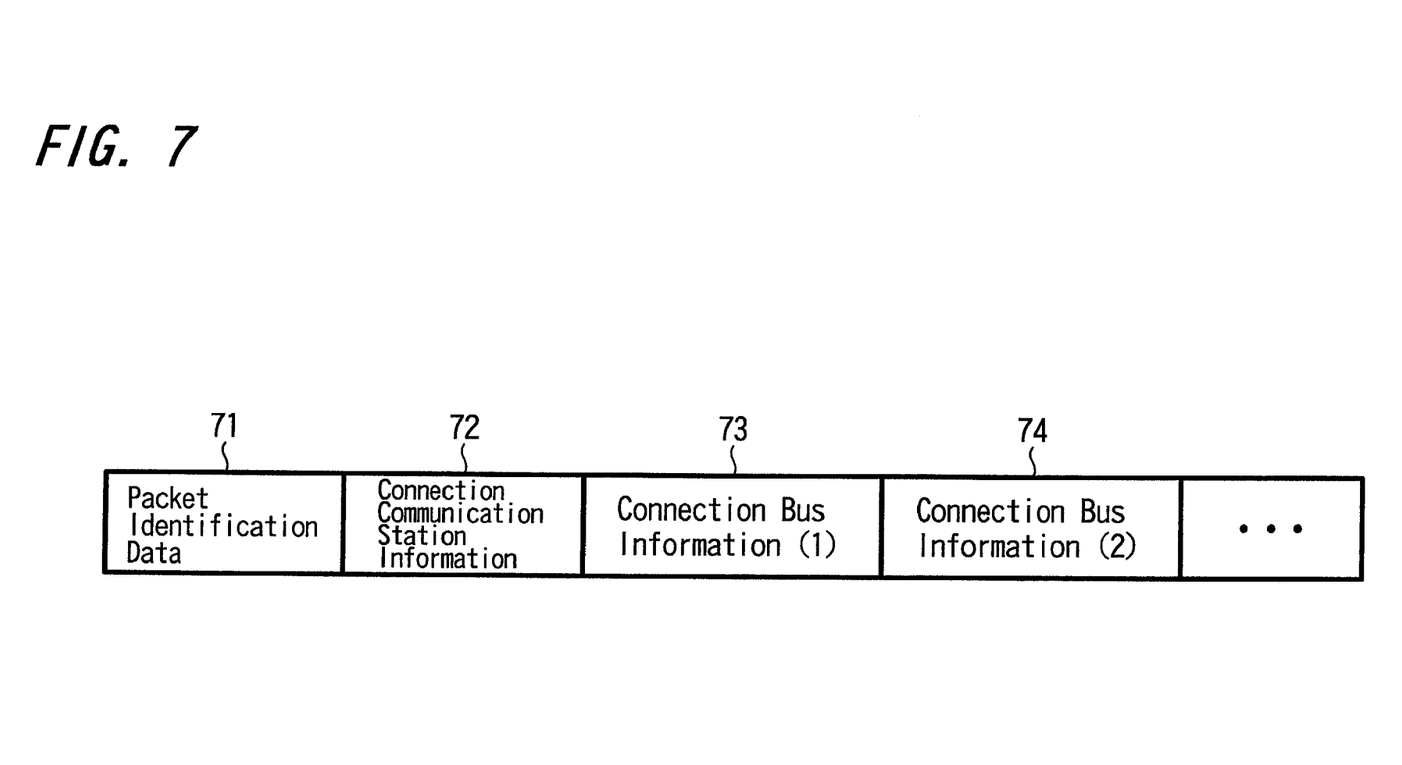
FIG. 7 is a diagram showing an example of a format of a transmission packet which is used to inform connection bus information.

FIG. 7 shows an example of a format of a transmission packet used to inform connection bus information.

As illustrated, a transmission packet is comprised of packet identification data 71 expressing connection bus information, connection communication station information 72 expressing a communication station to which connection bus information is informed and connection bus information (1) 73, (2) 74 . . . described by an amount corresponding to the number of connections.

In addition to these information, transmitted information may be adjusted according to the need.

While the above embodiment is applied to the wireless 1394 format by way of example, the present invention is not limited thereto and can of course be applied to other wireless networks.

According to the network management method of the present invention, when the structure of the bus connected to the preceding communication station of its own communication station is changed, the notice indicating that the connection bus information is changed is informed to the network, whereby all communication stations comprising the network can share the connection bus information. Therefore, each communication station can manage corresponding connection bus information in a decentralized fashion.

According to the network management method of the present invention, when information is transmitted through the bus, since the communication station to which information is transmitted by radio can be designated in each case, it is not necessary to inquire in advance the control station about the communication station to which corresponding bus ID information is transmitted by radio. Therefore, information can be transmitted immediately.

Further, according to the network management method of the present invention, when the structure of the bus connected to the preceding communication station of its own communication station is changed, the notice indicating that connection bus information is changed is informed to the network, whereby each communication station can manage the corresponding connection bus information in a decentralized fashion.

According to the wireless transmission apparatus or the wireless transmission method of the present invention, when information is transmitted, if the communication station to which information is transmitted by radio is specified based on the previously distributed connection bus information of other communication station, then it is not necessary to inquire the control station about the communication station to which corresponding bus ID information is transmitted by radio. Therefore, information can be transmitted immediately.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. In a wireless transmission apparatus for constructing a wireless network by using a plurality of transmission apparatus to transmit information among it and a plurality of other communication stations, said wireless transmission apparatus being characterized by:
    interface means for detecting connection bus information of a bus connected to a certain wireless transmission apparatus;
    wireless information transmitting means for transmitting corresponding connection bus information to said wireless network;
    wireless information receiving means for receiving connection bus information transmitted from other wireless transmission apparatus located within said wireless network; and
    internal storage means for storing therein these connection bus information,
    wherein said wireless information transmitting means transmits said connection bus information to said wireless network when said interface means detects a change of connection bus information.

2. In a wireless transmission apparatus for constructing a wireless network by using a plurality of transmission apparatus to transmit information among it and a plurality of other communication stations, said wireless transmission apparatus being characterized by:

internal storage means for storing therein connection bus information within said wireless network; and judging means for judging based on connection bus information of said wireless network whether or not information should be transmitted by radio when it receives wireless transmission information from a connection bus connected to a corresponding wireless transmission apparatus.

3. In a wireless transmission apparatus for constructing a wireless network by using a plurality of transmission apparatus to transmit information among it and a plurality of other communication stations, said wireless transmission apparatus being characterized by:

internal storage means for storing therein connection bus information within said wireless network; and recognizing means f or recognizing a wireless transmission apparatus to which information is transmitted by radio based on connection bus information in each of said other communication stations when it receives wireless transmission information from a connection bus connected to a corresponding wireless transmission apparatus.

4. In a network management method in which a wireless network is composed of a plurality of transmission apparatus to transmit information, said network management method comprising the steps of:

providing network connection bus information connected to a corresponding wireless network;

managing the corresponding wireless network by all communication stations comprising said network, and transmitting the network connection bus information to the corresponding wireless network upon detecting a change of the network connection bus information.

5. In a network management method in which a wireless network is composed of a plurality of transmission apparatus to transmit information, said network management method comprising the steps of:

detecting when connection bus information connected to its own communication station connected to a corresponding wireless network is changed; and transmitting information indicative of said change of connection bus information to all the transmission apparatuses making up said wireless network.

6. In a wireless transmission method in which a wireless network is composed of a plurality of transmission apparatus to transmit information, said wireless transmission method comprising the steps of:

designating a destination communication station to which information is transmitted by radio; and determining, based on bus information of wireless transmission information in a corresponding wireless network and network connection bus information connected to a corresponding wireless network, whether information should be transmitted by radio, wherein said connection bus information is transmitted to said wireless network when a change of connection bus information is detected.

7. In a wireless transmission method in which a wireless network is composed of a plurality of transmission apparatus to transmit information, said wireless transmission method comprising the steps of:

designating, a destination communication station to which information is transmitted by radio; and providing said designated destination communication station with reference to bus information of corresponding wireless transmission information and connection bus information connected to every communication station connected to a corresponding wireless network, wherein said connection bus information is transmitted to said wireless network when a change of connection bus information is detected.

* * * * *